US012744812B1

(12) United States Patent
Ding et al.

(10) Patent No.: US 12,744,812 B1
(45) Date of Patent: Sep. 22, 2026

(54) DETECTION OF STRUCTURED QUERY LANGUAGE INJECTION ATTACKS

(71) Applicant: Trend Micro Incorporated, Tokyo (JP)

(72) Inventors: Liwei Ding, Round Rock, TX (US); Russell Meyers, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 68 days.

(21) Appl. No.: 18/925,977

(22) Filed: Oct. 24, 2024

Related U.S. Application Data

(60) Provisional application No. 63/695,452, filed on Sep. 17, 2024.

(51) Int. Cl.
*H04L 9/40* (2022.01)

(52) U.S. Cl.
CPC ................................ *H04L 63/1466* (2013.01)

(58) Field of Classification Search
CPC .................................................. H04L 63/1466
See application file for complete search history.

(56) References Cited

U.S. PATENT DOCUMENTS 11,829,486 B1 * 11/2023 Lambotte ................. G06N 3/09
2024/0022600 A1 * 1/2024 Zhang ................. H04L 63/1466
2024/0378206 A1 * 11/2024 Po ..................... G06F 16/24566

OTHER PUBLICATIONS

Tao Yu, Rui Zhang, Kai Yang, Michihiro Yasunaga, Dongxu Wang, Zifan Li, James Ma, Irene Li, Qingning Yao, Shanelle Roman, Zilin Zhang, Dragomir R. Radev, "Spider: A Large-Scale Human-Labeled Dataset for Complex and Cross-Domain Semantic Parsing and Text-to-SQL Task", Department of Computer Science, Yale University, Proceedings of the 2018 Conference on Empirical Methods in Natural Language Processing, pp. 3911-3921 Brussels, Belgium, Oct. 31-Nov. 4, 2018. Association for Computational Linguistics.
"SQL Injection", Wikipedia, https://en.wikipedia.org/wiki/SQL_injection, Downloaded Oct. 18, 2024.

* cited by examiner

*Primary Examiner* — J. Brant Murphy
*Assistant Examiner* — Christopher Lam
(74) *Attorney, Agent, or Firm* — Beyer Law Group LLP

(57) ABSTRACT

A Structured Query Language (SQL) injection detector extracts metadata of an SQL query to be submitted to an SQL database and identifies a related database schema of the SQL database. The metadata and the database schema are included in a prompt that is input to a Large Language Model (LLM), which generates an output that is responsive to the prompt. A response action is performed responsive to detecting from the output of the LLM that the SQL query is indicative of an SQL injection attack.

8 Claims, 11 Drawing Sheets

301

| Data Schema | Question | Ground Truth |
|---|---|---|
| Q1: stadium: Stadium_ID, Location, Name, Capacity, Highest, Lowest, Average singer: Singer_ID, Name, Country, Song Name,Song release_year, Age, Is_male Stadium_ ID, Year singer _in_concert: concert ID, Singer_ID | What is the average, minimum, and maximum age of all singers from France? | SELECT avg(age) , min(age ) , max(age) FROM singer WHERE country = 'France' |
| | Show name, country, age for all singers ordered by age from the oldest to the youngest. | SELECT name Age FROM singer ORDER BY age DESC |

| Data Schema | Query | Sensitive Data Requirements | Ground Truth |
|---|---|---|---|
| Q1: stadium: Stadium_ID, Location, Name, Capacity, Highest, Lowest, Average singer: Singer_ID, Name, Country, Song Name, Song release year, Age, Is male concert: concert_ID, concert_ Name, Theme, Stadium_ID, Year singer_ in_concert: concert_ID, Singer_ID | SELECT avg(age), min(age), max(age) FROM singer WHERE country = 'France' | Name and Country are sensitive information. | No sensitive Info revealed : ( "injection detected": F; "sensitive data leaked": F; "Unauthorized operation"; F; |
| | SELECT name, country, age FROM singer ORDER BY age DESC | We should not reveal signer's age. | Sensitive data is leaked: ( "injection detected": F; "sensitive data leaked": T; "unauthorized operations": F; |

FIG. 3

341

```
{
  'source': '/v1/Customer/info',
  'method': 'GET',
  'protocol: 'http'
}
```

```
--
-- Table structure for table `Users`
--

DROP TABLE IF EXISTS `Users`;
/*!40101 SET @saved_cs_client     = @@character_set_client */;
/*!50503 SET character_set_client = utf8mb4 */;
CREATE TABLE `Users` (
  `user_id` int NOT NULL AUTO_INCREMENT,
  `username` varchar(255) NOT NULL,
  `password_hash` varchar(255) NOT NULL,
  `role` enum('admin','employee','customer') NOT NULL,
  PRIMARY KEY (`user_id`),
  UNIQUE KEY `username` (`username`)
) ENGINE=InnoDB AUTO_INCREMENT=4 DEFAULT CHARSET=utf8mb4
COLLATE=utf8mb4_0900_ai_ci;
/*!40101 SET character_set_client = @saved_cs_client */;

DROP TABLE IF EXISTS `Customers`;
/*!40101 SET @saved_cs_client     = @@character_set_client */;
/*!50503 SET character_set_client = utf8mb4 */;
CREATE TABLE `Customers` (
  `customer_id` int NOT NULL AUTO_INCREMENT,
  `name` varchar(255) NOT NULL,
  `email` varchar(255) NOT NULL,
  `phone_number` varchar(20) DEFAULT NULL,
  `address` text,
  `join_date` date DEFAULT (curdate()),
  PRIMARY KEY (`customer_id`),
  UNIQUE KEY `email` (`email`)
) ENGINE=InnoDB AUTO_INCREMENT=4 DEFAULT CHARSET=utf8mb4
COLLATE=utf8mb4_0900_ai_ci;
/*!40101 SET character_set_client = @saved_cs_client */;
```

```
{
  "level_define": {
    "low": 1,
    "medium": 2,
    "high": 3,
    "confidential": 4
  },

  "database": {
    "Users": {
      "user_id": 2,
      "username": 3,
      "password_hash": 4,
      "role": 4
    },
    "Customers": {
      "customer_id": 1,
      "name": 2,
      "email": 3,
      "phone_number": 3,
      "address": 3,
      "join_date": 1
    }
  }

}
```

Rule 1: All the database informaiton can only be revealed by the URI requests containing the exact same table name;
Rule 2: For the security level higher than 2, must use SSL transaction;
Rule 3: For the security level higher than 1, the column data can only be altered in POST request;

FIG. 7

DETECTION OF STRUCTURED QUERY LANGUAGE INJECTION ATTACKS

CROSS-REFERENCE TO RELATED APPLICATION

This application claims the benefit of U.S. Provisional Patent Application No. 63/695,452, filed on Sep. 17, 2024, the entire disclosure of which is incorporated herein by reference.

TECHNICAL FIELD

The present disclosure is directed to cybersecurity.

BACKGROUND

Structured Query Language (SQL) injection is a prevalent form of cyberattack that targets the interaction between web applications and their databases. Attackers exploit vulnerabilities in the web application's program code by injecting malicious SQL statements into input fields, potentially gaining unauthorized access to sensitive data, modifying database contents, or executing administrative operations. Traditional SQL injection detection methods, such as signature-based and anomaly-based approaches, often fail to effectively identify sophisticated or novel attack patterns.

BRIEF SUMMARY

In one embodiment, a Structured Query Language (SQL) injection detector extracts metadata of an SQL query and identifies a related database schema of an SQL database. The metadata and the database schema are included in a prompt that is input to a Large Language Model (LLM), which generates an output that is responsive to the prompt. A response action is performed responsive to detecting from the output of the LLM that the SQL query is indicative of an SQL injection attack.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3 schematically illustrates preparation of an example training dataset for fine-tuning a Large Language Model (LLM), in accordance with an embodiment of the present invention.

FIG. 5 shows an example metadata, in accordance with an embodiment of the present invention.

FIG. 6 shows an example database schema, in accordance with an embodiment of the present invention.

FIG. 7 shows an example security level information, in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
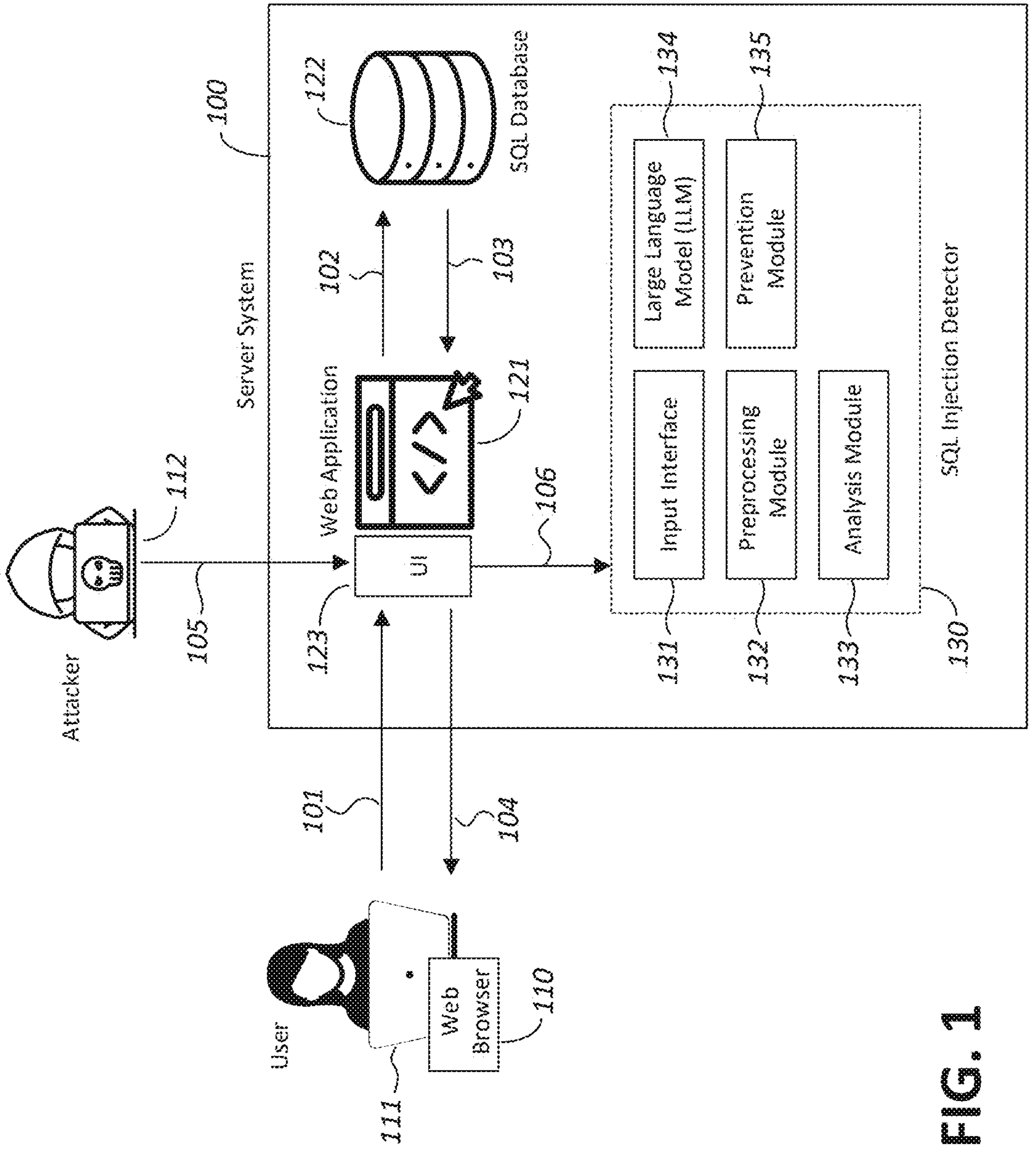
FIG. 1 shows a block diagram of a server system, in accordance with an embodiment of the present invention.

FIG. 1 shows a block diagram of a server system 100, in accordance with an embodiment of the present invention. The server system 100 may be implemented on a dedicated server system, interconnected computer systems, a cloud computing platform (e.g., Amazon Web Services (AWS) TM platform), or other computer system. In the example of FIG. 1, the server system 100 hosts an SQL injection detector 130, which in one embodiment is implemented as program code with instructions that are executed by at least one processor of the server system 100. The SQL injection detector 130 is configured to analyze SQL queries submitted to the SQL database 122 for indicators of SQL injection.

The SQL injection detector 130, the web application 121, and the SQL database 122 are explained as hosted on the server system 100 for clarity of illustration. As can be appreciated, the functionalities of the web application 121, the SQL database 122, and the SQL injection detector 130 may be implemented on separate computer systems. For example, the SQL database 122 may be hosted on a separate backend server system, with the web application 121 and the SQL database 122 communicating over the public Internet.

The web application 121 allows users to perform tasks like submitting forms, retrieving data, or conducting transactions involving the SQL database 122. The web application 121 may be that of an e-commerce platform, content management system, social media platform, online banking system, or other online service available on the public Internet. The web application 121 provides a user interface 123, such as a webpage, that includes input fields for receiving input data from users. Users that request data of the SQL database 122 by way of the web application 121 are also referred to herein as "requesters".

In an example operation, a user may employ a web browser 110 running on a user computer 111 to navigate to the user interface 123 to interact with the web application 121 over the public Internet. The user, by way of the user interface 123, may submit a form to the web application 121 (see arrow 101), requesting data that is available from the SQL database 122. The web application 121, responsive to the request, incorporates the request into an SQL query that is submitted to the SQL database 122 (see arrow 102). Responsive to the SQL query, the SQL database 121 returns a query result that includes the requested data (see arrow 103), which the web application 121 forwards to the user computer 111 over the public Internet (see arrow 104).

An attacker in a SQL injection attack can use a computer 112 to manipulate the input to the web application 121 (see arrow 105) to alter the structure of a corresponding SQL query sent to the SQL database 122. Generally, a web application can accept user input data by way of forms, uniform resource locator (URL) parameters, or cookies, and if this input data is not properly sanitized or validated, attackers can inject a malicious SQL query to obtain data from the SQL database 122 or cause malicious operations. In the example of FIG. 1, the SQL injection detector 130 receives incoming SQL queries to be submitted to the SQL database 122 (see arrow 106), analyzes the SQL queries for indicators of SQL injection, and, responsive to detecting an SQL injection, performs a response action to prevent the SQL injection. The SQL injection detector 130 may receive an SQL query by generating the SQL query from user input data, from the input to the SQL database 122, from the web application 121, or by some other way.

The SQL injection detector 130 leverages the interpretative power and predictive capabilities of Large Language Models (LLMs) to comprehend and analyze SQL queries, enhancing the detection of SQL injections. More specifically, the SQL injection detector 130 detects and prevents SQL injections in real-time by using one or more LLMs to accurately interpret SQL queries, understand the database schema of the SQL database 122, and predict corresponding expected query outputs of the SQL database 122. SQL injections are detected and stopped in real-time by analyzing the expected query outputs against the database schema definition, identifying potential sensitive information leaks, unexpected data modifications, unauthorized database access, and correlation query attacks.

In one embodiment, the SQL injection detector 130 comprises an input interface 131, preprocessing module 132, analysis module 133, LLM 134, and prevention module 135. The input interface 131 is configured to capture incoming SQL queries, extract metadata of the SQL queries, and pass the metadata to the preprocessing module 132. The preprocessing module 132 combines the incoming SQL queries and their metadata into a prepared prompt along with the definition of the associated database schema of the SQL database 122. Optionally, the preprocessing module 132 may tokenize the content of the prompt to ensure compatibility with the LLM 134. In one embodiment, the LLM 134 is a pre-trained LLM capable of understanding and interpreting SQL queries. The LLM 134 may be trained on a diverse corpus of SQL statements, including legitimate SQL queries and known SQL injections.

The analysis module 133 inputs the prepared prompt to the LLM 134 to analyze the SQL queries for potential injection patterns, intentions, and behaviors. The analysis module 133 leverages the LLM's 134 contextual understanding to differentiate between legitimate queries and queries that are indicative of SQL injection. Responsive to detection of an SQL injection, the prevention module 135 blocks SQL transactions associated with the SQL query, terminates the web connection to the user interface 123, and/or generates security alerts. The alerts can be transmitted to other security analytics systems and/or cybersecurity personnel to perform deeper analysis and trigger additional security responses, such as patch the web application 121 and block the attacker's computer.

Figure 2:
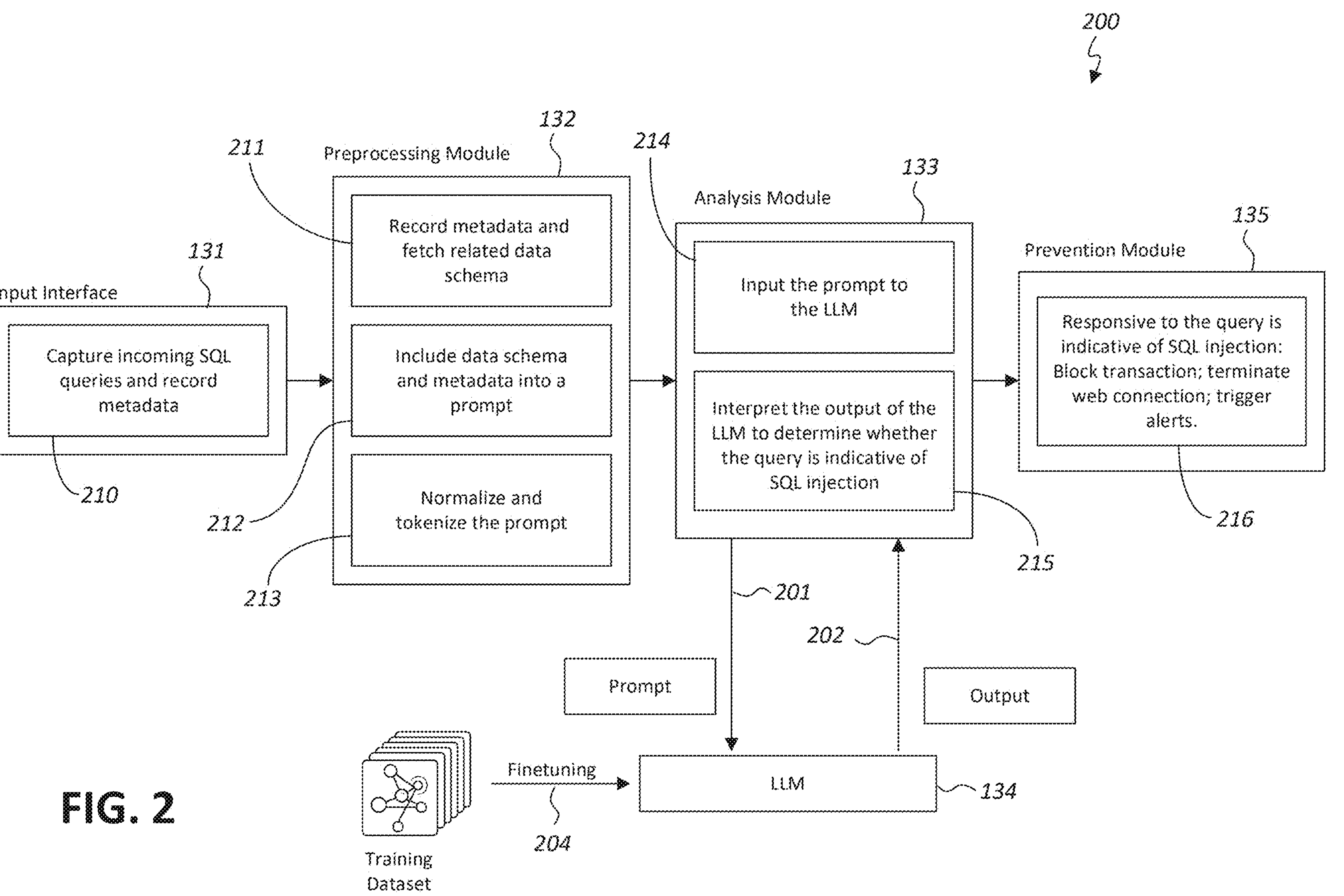
FIG. 2 shows a flow diagram of a method of detecting Structured Query Language (SQL) injection attacks, in accordance with an embodiment of the present invention.

FIG. 2 shows a flow diagram of a method 200 of detecting SQL injection attacks, in accordance with an embodiment of the present invention. The method 200 may be performed by the SQL injection detector 130.

In step 210, the input interface 131 captures incoming SQL queries to be submitted to the SQL database 122, and extracts and records the metadata of the SQL queries. In one embodiment the recorded metadata of an SQL query includes the uniform resource identifier (URI) of the user interface 123, the query string of the SQL query, and the transaction method associated with the SQL query.

In step 211, the preprocessing module 132 fetches the database schema of the SQL database 122 that is related to the recorded metadata. More particularly, the preprocessing module 132 may parse the query string to determine which tables of the SQL database 122 are involved in the SQL query, prepare all the schema-related information of these tables, and analyze the metadata to grant the sensitivity level of various data in the SQL database 122 based on the source of the transaction. The database schema of the SQL database 122 and sensitivity levels of columns and other fields in the SQL database 122 may be made available to the preprocessing module 132 at the server system 100 or other location accessible to the preprocessing module 132.

In step 212, the preprocessing module 132 merges the database schema and the recorded metadata into a prompt.

In step 213, the preprocessing module 132 normalizes and tokenizes the prompt.

In step 214, the analysis module 133 feeds the prompt into the LLM 134 (see arrow 201). The LLM 134 analyzes the metadata of the SQL queries by leveraging its deep understanding of SQL language and common injection patterns. The LLM 134 also evaluates the structure, syntax, and semantics of the SQL queries to identify if any unauthorized query will be executed. Responsive to the prompt, the LLM 134 generates an output that is received by the analysis module 133 (see arrow 202). For example, the output of the LLM 134 may have the following format:

"injection detected": T/F;

"sensitive data leaked": T/F;

"unauthorized operations": T/F.

with "T/F" indicating whether or not an SQL injection is detected. More particularly, a "T" indicates a logical TRUE and an "F" indicates a logical FALSE. When "injection detected" is "T", the corresponding SQL query has been detected to be indicative of an SQL injection in general. Sensitive data leakage is detected when "sensitive data leaked" is "T", and execution of unauthorized operations is detected when "unauthorized operations" is "T". It is to be noted that sensitive data leakage and execution of unauthorized operations are specific examples of SQL injections. That is, any "T" result in the above example output indicates that the corresponding SQL query is indicative of an SQL injection.

It should be noted that the output of the LLM 134 provides a predictive assessment of the potential consequences if SQL queries were to be executed by the SQL database 122. Specifically, the method 200 analyzes SQL queries before they are submitted to the SQL database 122. This proactive approach effectively allows the SQL injection detector 130 to intercept and block SQL injection attacks before they can cause any damage.

In step 215, the analysis module 133 interprets the output of the LLM 134 to determine whether the SQL query is indicative of an SQL injection. The analysis module 133 may analyze contextual clues from the LLM output, including whether the query's characteristics match known SQL injection patterns, whether the requestor is authorized to perform the transaction, and whether the query may lead to a potential data leak or unauthorized data access after execution.

In step 216, responsive to detecting an SQL injection, the prevention module 135 may block the SQL transaction associated with the SQL query, terminate the web connection to the web application 121, and/or trigger alerts. An SQL transaction or web connection may be blocked by an inline network security system, for example. The alert allows a backend security analysis team to be notified to patch the web application 121, quarantine unauthorized clients, or perform other mitigation.

The LLM 134 may be fine-tuned to reinforce its ability to predict a query result based on the database schema provided and judge whether the predicted query result is indicative of SQL injection. Training dataset for finetuning (see arrow 204) the LLM 134 may be set with following sections: "Database schema", "Query", "Sensitive Data Requirement" and "Ground Truth". The initial large training dataset for finetuning can leverage the Spider dataset by adding "Query" and "Sensitive Data Requirement" sections and altering the "Ground Truth".

FIG. 3 schematically illustrates preparation of an example training dataset for fine-tuning the LLM 134 (e.g., LLaMA3), in accordance with an embodiment of the present invention. In the example of FIG. 3, the table 301 shows a portion of database schema, questions, and ground truth of the Spider dataset, whereas the table 302 shows the table 301 modified to detect SQL injections. Only a very small portion of the tables are shown for clarity of illustration. In the example of FIG. 3, the table 302 adds a query column and a sensitive data column that identifies sensitive data to the table 301. The table 302 also modifies the ground truth of table 301 to detect when sensitive data is revealed by the query. The table 302 may be used to fine-tune the LLM 134 to detect SQL injections.

Figure 4:
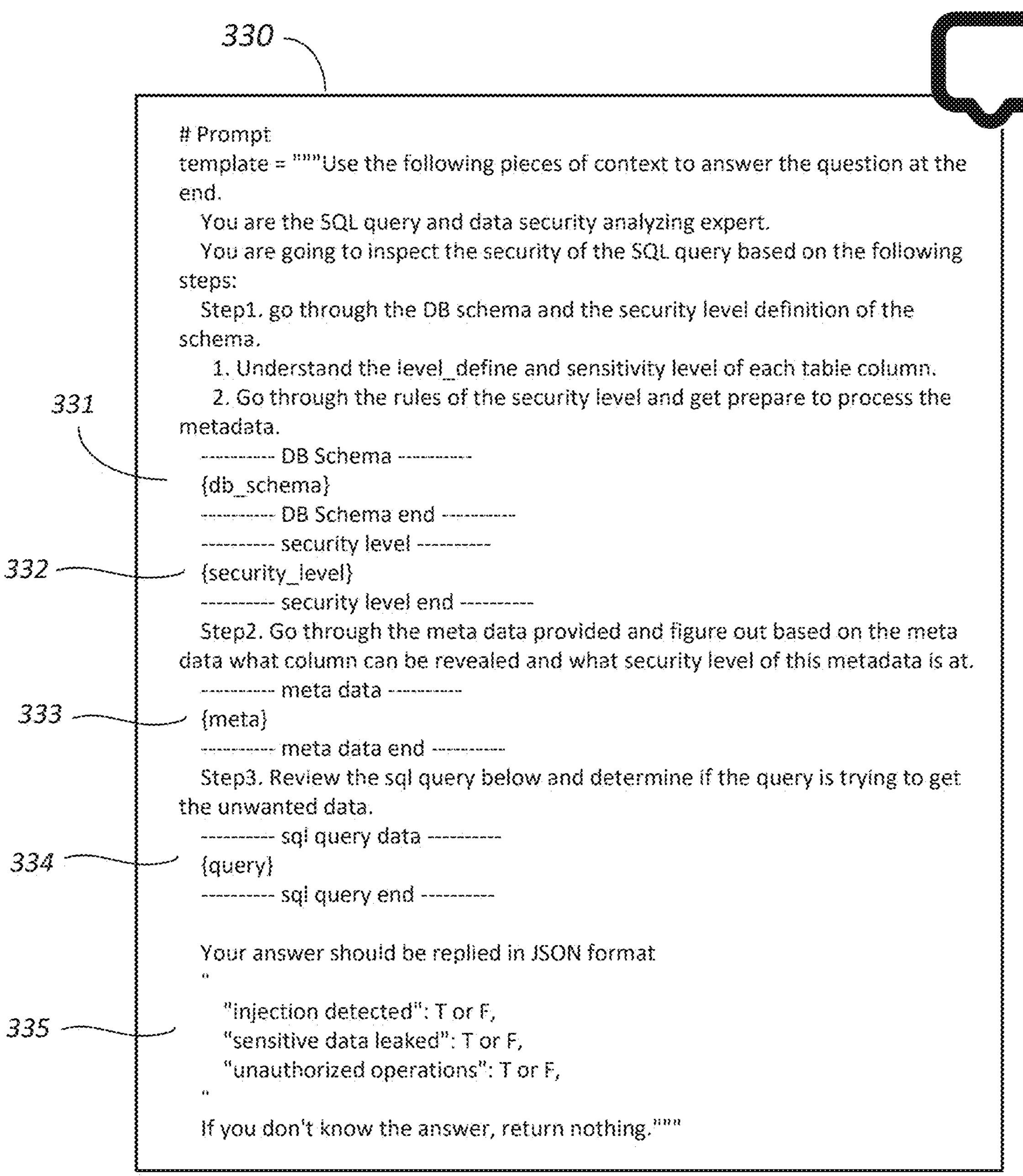
FIG. 4 shows an example prompt, in accordance with an embodiment of the present invention.

FIG. 4 shows an example prompt 330, in accordance with an embodiment of the present invention. The prompt 330 may be generated by the preprocessing module 132 and input to the LLM 134 by the analysis module 133.

The prompt 330 includes a template that guides the LLM 134, in a step-by-step manner, how to evaluate information that is included in the prompt. In the example of FIG. 4, the prompt 330 includes a database schema 331, security level information 332, metadata 333, query data 334, and an output format 335. The query data 334 includes the query string of the target SQL query (i.e., SQL query being evaluated for SQL injection), and the metadata 333 is the metadata of the target SQL query that was extracted and recorded by the preprocessing module 132. The database schema 331 is the schema of columns or other fields of the SQL database 122 that are involved in the target SQL query as per the metadata. The security level information 332 indicates the predetermined security levels of columns and other fields of the table of the SQL database 122 that are involved in the target SQL query. The output format 335 is in JSON format in this example. The prompt 330 provides sufficient information and guidance to the LLM 134 for accurate prediction outputs.

FIG. 5 shows an example metadata 341, in accordance with an embodiment of the present invention. In the example of FIG. 5, the metadata 341 includes the source of the target SQL query, the transaction method of the target SQL query, and the web communication protocol to the user interface 123. The metadata 341 may be extracted from the target SQL query and recorded by the preprocessing module 132 for inclusion in a prompt that is input to the LLM 134 by the analysis module 133.

FIG. 6 shows an example database schema 342, in accordance with an embodiment of the present invention. In the example of FIG. 6, the database schema 342 includes the schema for the "Customers" and "Users" columns, which are involved in the target SQL query as per its metadata. The database schema 342 may be fetched by the preprocessing module 132 from a predetermined repository for inclusion in a prompt that is input to the LLM 134 by the analysis module 133.

FIG. 7 shows an example security level information 343, in accordance with an embodiment of the present invention. In the example of FIG. 7, the security level information 343 includes security level information for "Customers" and "Users" columns, which are involved in the target SQL query as per its metadata. The security level information 343 includes rules for accessing data of particular security levels. The security level information 343 may be fetched by the preprocessing module 132 from a predetermined repository for inclusion in a prompt that is input to the LLM 134 by the analysis module 133. Inclusion of the security level information 343 in a prompt advantageously improves the ability of the LLM 134 to detect SQL injections, which often involve unauthorized retrieval of sensitive data from the SQL database 122. More particularly, the security level information 343 enhances the LLM's 134 ability to detect unauthorized access to the SQL database 122.

Figure 8:
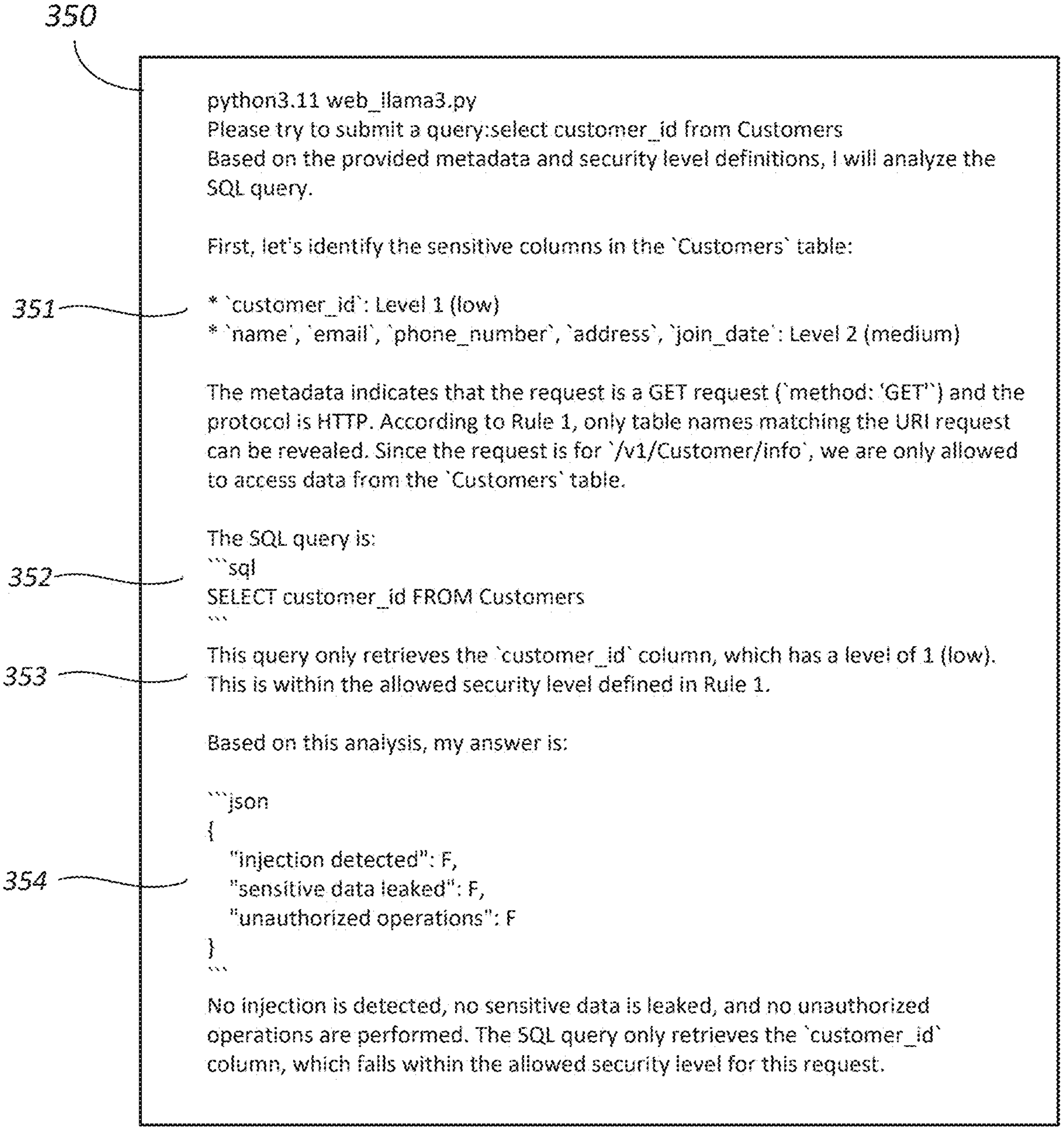
FIG. 8 shows an example LLM output, in accordance with an embodiment of the present invention.

FIG. 8 shows an example output 350 from the LLM 134, in accordance with an embodiment of the present invention. The output 350 is responsive to a prompt, such as the prompt 330 of FIG. 4. In the example of FIG. 8, the output 350 identifies the security levels of the columns involved in the target SQL query (FIG. 8, 351) and repeats the query string of the target SQL query (FIG. 8, 352). The output 350 provides reasoning for the conclusion of the LLM 134 (FIG. 8, 353), which is in JSON format as per the prompt (FIG. 8, 354). The output 350 indicates that no SQL injection is detected, no sensitive data is leaked, and no unauthorized operation is detected. Therefore, it is safe to submit the target SQL query to the SQL database 122. The analysis module 133 interprets the output 350, and allows the target SQL query to be submitted to the SQL database 122 responsive to detecting that the target SQL query is safe.

Figure 9A:
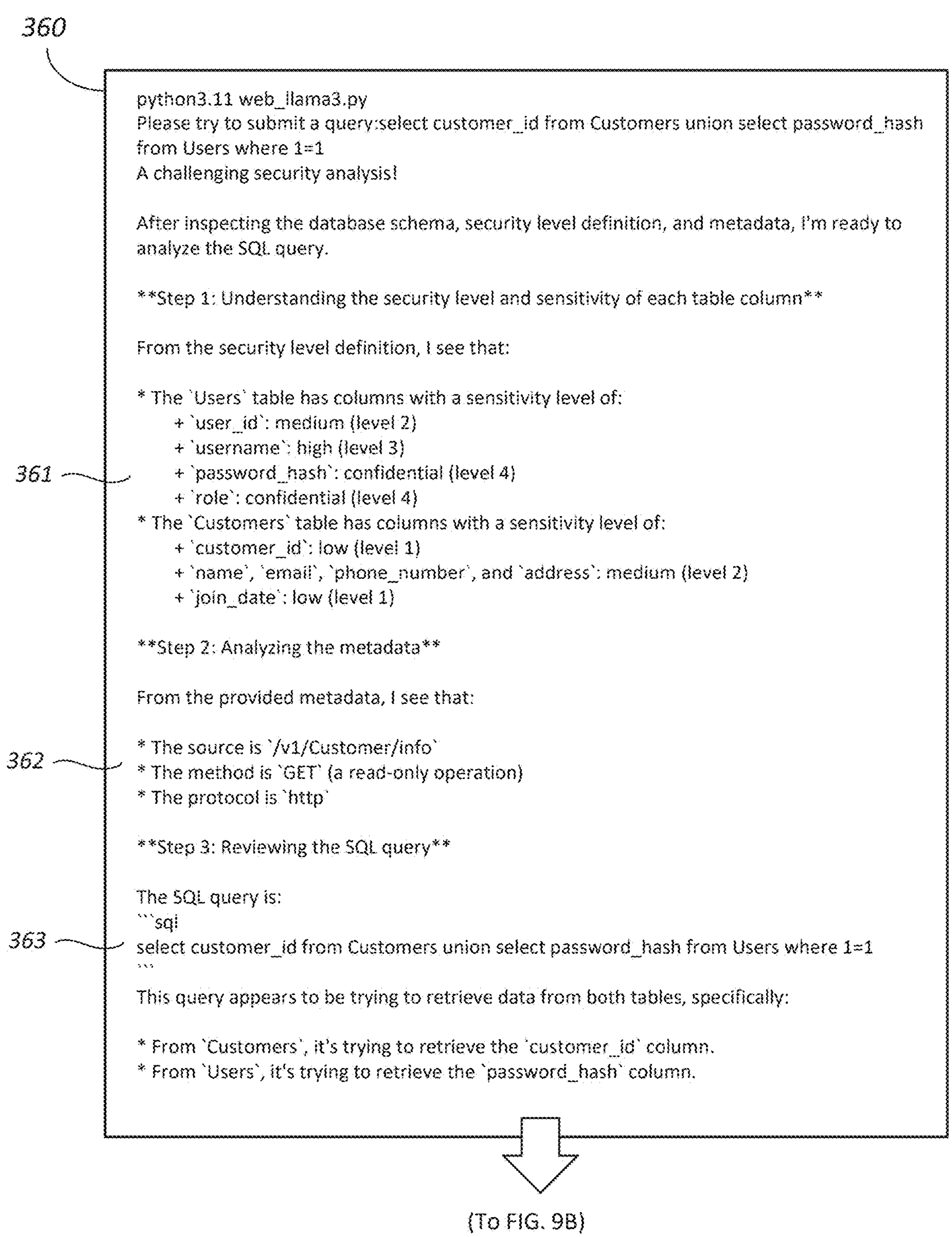
FIGS. 9A and 9B show an example LLM output, in accordance with an embodiment of the present invention.
Figure 9B:
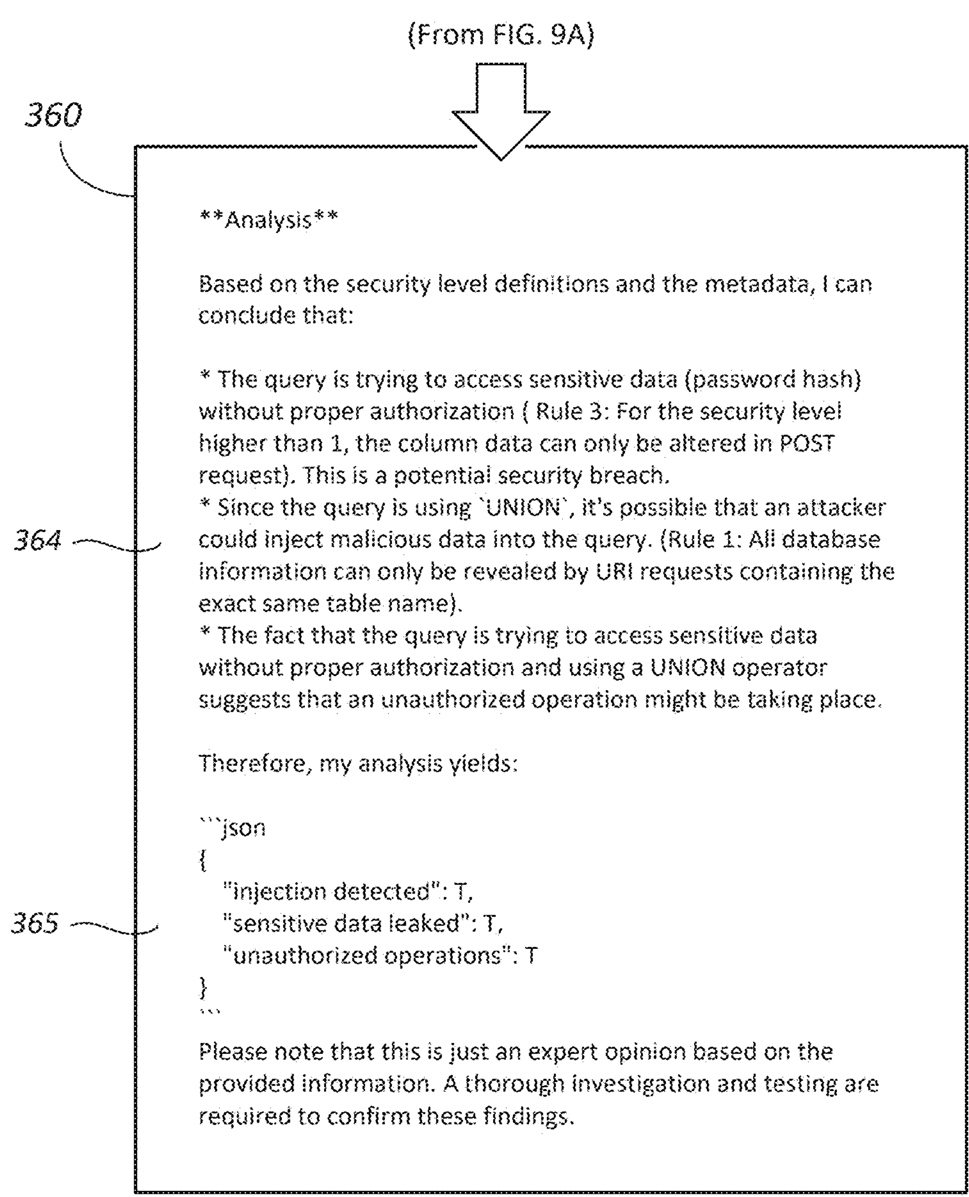

FIGS. 9A and 9B show an example output 360 from the LLM 134, in accordance with an embodiment of the present invention. The output 360 begins on FIG. 9A and continues to FIG. 9B. The output 360 is responsive to a prompt, such as the prompt 330 of FIG. 4.

In the example of FIGS. 9A and 9B, the output 360 identifies the security levels of the columns involved in the target SQL query (FIG. 9A, 361), repeats the metadata of the target SQL query (FIG. 9A, 362), and repeats the query string of the target SQL query (FIG. 9A, 363). The output 360 provides reasoning for the conclusion of the LLM 134 (FIG. 9B, 364), which is in JSON format as per the prompt (FIG. 9B, 365). The output 360 indicates that SQL injection is detected, sensitive data is leaked, and unauthorized operation is detected. Therefore, it is not safe to submit the target SQL query to the SQL database 122. The analysis module 133 interprets the output 360, and detects that the target SQL query is indicative of SQL injection. In response, the prevention module 135 blocks the transaction associated with the target SQL query, terminates the web connection of the requestor to the user interface 123, and/or triggers alerts to notify responsible cybersecurity personnel, cybersecurity systems, etc.

Figure 10:
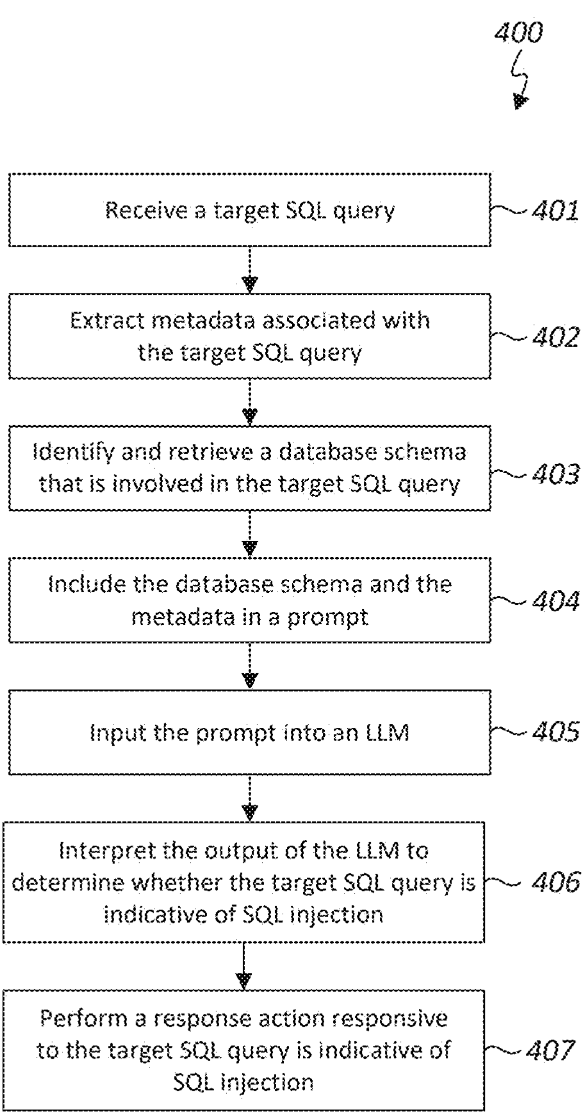
FIG. 10 shows a flow chart of a method of detecting SQL injection attacks, in accordance with an embodiment of the present invention.

FIG. 10 shows a flow chart of a method 400 of detecting SQL injection attacks, in accordance with an embodiment of the present invention. The method 400 may be performed by the SQL injection detector 130. As can be appreciated, other components may also be employed without detracting from the merits of the present invention. The method 400 is explained in the context of a single SQL query for clarity of illustration.

In step 401, the SQL injection detector 130 receives a target SQL query to be submitted to the SQL database 122.

In step 402, the SQL injection detector 130 extracts and records the metadata associated with the target SQL query.

In step 403, the SQL injection detector 130 identifies and retrieves a database schema of the SQL database 122 that is involved in the target SQL query. For example, responsive to identifying certain columns of a table that are involved in the target SQL query, the SQL injection detector 130 retrieves the database schema of the identified columns of the table.

In step 404, the SQL injection detector 130 generates a prompt that includes the metadata and the database schema. In one embodiment, the prompt further includes sensitive level information of columns and other fields of the SQL database 122.

In step 405, the SQL injection detector 130 inputs the prompt into an LLM that has been fine-tuned to detect SQL injections.

In step 406, the SQL injection detector 130 interprets the output of the LLM to determine whether the target SQL query is indicative of SQL injection.

In step 407, the SQL injection detector 130 performs a response action responsive to detecting that the target SQL query is indicative of SQL injection.

Figure 11:
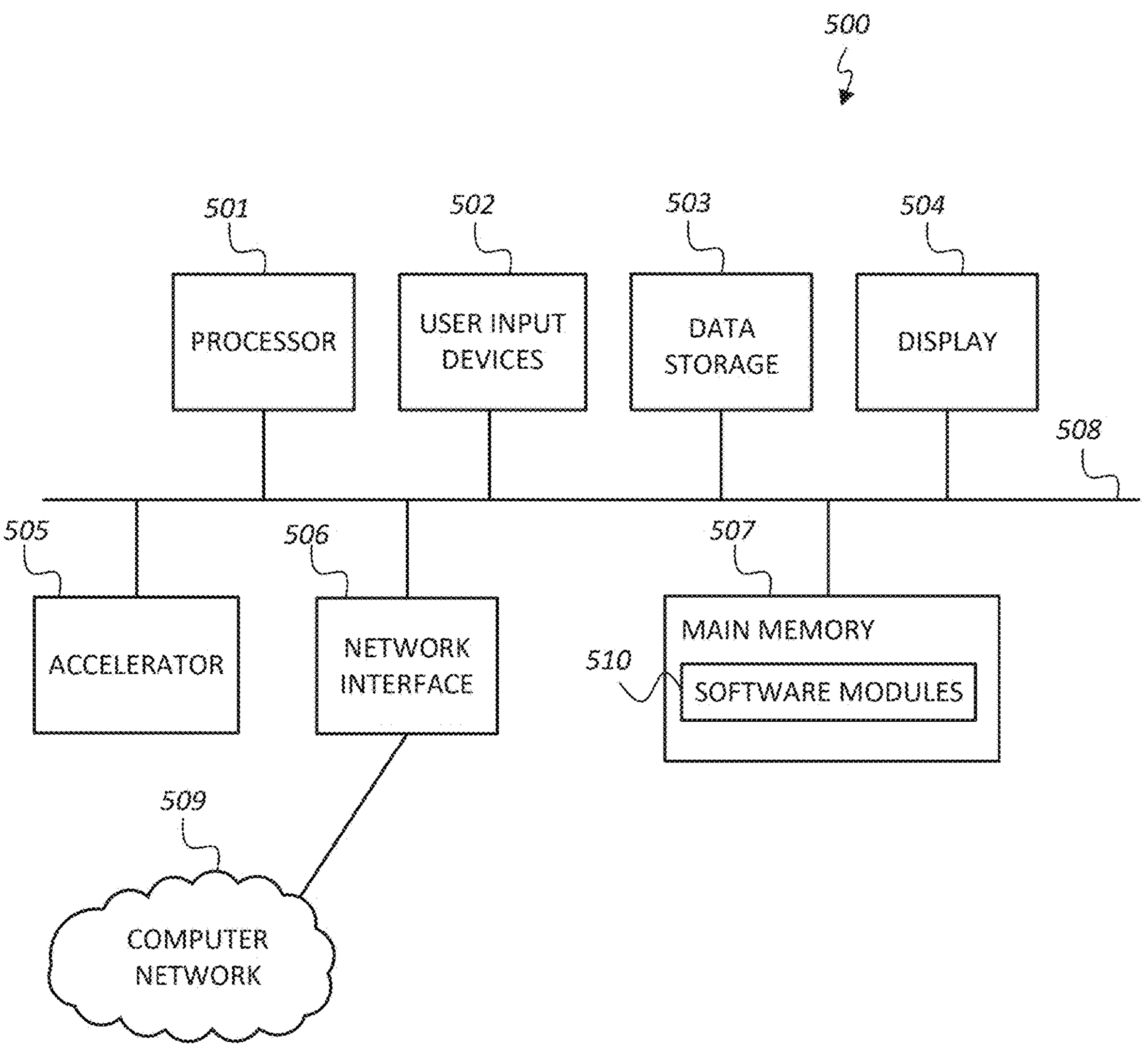
FIG. 11 shows a block diagram of a computer system that may be employed with embodiments of the present invention.

FIG. 11 shows a block diagram of a computer system 500 that may be employed with embodiments of the present invention. The computer system 500 may be employed as a server system or other computer described herein. The computer system 500 may have fewer or more components to meet the needs of a particular application. The computer system 500 may include one or more processors 501, one or more user input devices 502 (e.g., keyboard, mouse), one or more data storage devices 503 (e.g., hard drive, optical disk, solid state drive), a display screen 504 (e.g., liquid crystal display, flat panel monitor), one or more accelerators 505 (e.g., graphics processing unit (GPU), neural processing unit (NPU)), a computer network interface 506 (e.g., network adapter), and a main memory 507 (e.g., random access memory). The computer system 500 may have one or more buses 508 coupling its various components. The computer network interface 506 may be coupled to a computer network 509, which in this example includes the public Internet.

The computer system 500 is a particular machine as programmed with one or more software modules 510, comprising instructions stored non-transitory in the main memory 507 for execution by at least one processor 501 to cause the computer system 500 to perform corresponding programmed steps. An article of manufacture may be embodied as computer-readable storage medium including instructions that when executed by at least one processor 501 cause the computer system 500 to be operable to perform the functions of the one or more software modules 510. In one embodiment where the computer system 500 is configured as a server system, the software modules 510 comprise instructions of an SQL injection detector.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting a Structured Query Language (SQL) injection attack, the method comprising:

extracting metadata of a target SQL query, the metadata including a uniform resource identifier, before the target SQL query is submitted to an SQL database;

identifying a database schema of the SQL database that is involved in the target SQL query;

including the database schema and the metadata into a prompt;

inputting the prompt into a Large Language Model (LLM);

receiving an output from the LLM that is responsive to the prompt; and performing a response action responsive to the output of the LLM indicating that the target SQL query is indicative of an SQL injection attack.

2. The method of claim 1, wherein the response action includes blocking an SQL transaction associated with the target SQL query.

3. The method of claim 1, wherein the response action includes terminating a web connection to a web application that provides an interface to the SQL database.

4. The method of claim 1, wherein identifying the database schema of the SQL database that is involved in the target SQL query comprises:

parsing a query string of the target SQL query to identify a column of a table of the SQL database, wherein the database schema includes the schema of the column of the table.

5. A computer system comprising at least one processor and a memory, the memory of the computer system storing instructions that when executed by the at least one processor of the computer system cause the computer system to:

extract metadata of a target Structured Query Language (SQL) query, the metadata including a uniform resource identifier, before the target SQL query is submitted to an SQL database;

identify a database schema of the SQL database that is involved in the target SQL query;

include the database schema and the metadata into a prompt;

input the prompt into a Large Language Model (LLM);

receive an output from the LLM that is responsive to the prompt; and perform a response action responsive to the output of the LLM indicating that the target SQL query is indicative of an SQL injection attack.

6. The computer system of claim 5, wherein the response action includes blocking an SQL transaction associated with the target SQL query.

7. The computer system of claim 5, wherein the response action includes terminating a web connection to a web application that provides an interface to the SQL database.

8. The computer system of claim 5, wherein the instructions stored in the memory of the computer system when executed by the at least one processor of the computer system cause the computer system to identify the database schema of the SQL database that is involved in the target SQL query by:

parsing the target SQL query to identify a column of a table of the SQL database, wherein the database schema includes the schema of the column of the table.

* * * * *